United States Patent [19]
Kuno et al.

[11] Patent Number: 5,586,060
[45] Date of Patent: Dec. 17, 1996

[54] COMPACT ELECTRONIC EQUIPMENT HAVING A STATISTICAL FUNCTION

[75] Inventors: Michiaki Kuno, Yamatokoriyama; Takeshi Ogawa, Sakai, both of Japan

[73] Assignee: Sharp Kabushiki Kaisha, Osaka, Japan

[21] Appl. No.: 81,409

[22] Filed: Jun. 25, 1993

[51] Int. Cl.⁶ .................................................. G06F 17/10
[52] U.S. Cl. .............. 364/554; 364/710.01; 364/715.01; 395/352
[58] Field of Search .............................. 364/554, 709.06, 364/709.09, 710.01, 710.14, 736, 521, 709.14, 710.08, 710.10, 715.01; 395/144, 2.76, 140, 156

[56] References Cited

U.S. PATENT DOCUMENTS

| | | | |
|---|---|---|---|
| 2,951,235 | 8/1960 | Welsh | 364/554 X |
| 3,146,344 | 8/1964 | Palmer | 364/554 |
| 3,151,312 | 9/1964 | Beck | 364/554 X |
| 3,339,063 | 8/1967 | Norsworthy | 364/554 |
| 3,610,902 | 10/1971 | Rahenkamp et al. | 364/710.14 |
| 4,321,688 | 3/1982 | Sado et al. | 364/554 |
| 4,535,416 | 8/1985 | Kano et al. | 364/710.01 |
| 4,695,976 | 9/1987 | Nakanishi et al. | 364/709.09 |
| 4,794,553 | 12/1988 | Watanabe et al. | 364/710.01 |
| 4,794,554 | 12/1988 | Tamiya | 364/710.01 |
| 4,823,311 | 4/1989 | Hunter et al. | 364/709.14 |
| 4,852,057 | 7/1989 | Patton | 364/709.06 |
| 4,864,512 | 9/1989 | Coulson et al. | 364/481 |
| 4,866,650 | 9/1989 | Oba et al. | 364/736 |
| 4,908,786 | 3/1990 | Kuno et al. | 364/710.11 |
| 5,040,131 | 8/1991 | Torres | 364/521 |
| 5,245,559 | 9/1993 | Lapeyre | 364/710.14 |
| 5,289,394 | 2/1994 | Lapeyre | 364/710.14 |

FOREIGN PATENT DOCUMENTS 2-302622  12/1990  Japan .

Primary Examiner—Edward R. Cosimano
Attorney, Agent, or Firm—Nixon & Vanderhye P.C.

[57] ABSTRACT

The present invention provides a compact electronic equipment having a statistical graph display element for displaying a statistical graph based on statistical data and a calculation element for a calculation by using a statistic based on the statistical data to display a calculated result. According to the compact electronic equipment, statistics such as a process ability index can be automatically calculated. Upper and lower specification limits used in the calculation as well as the process ability index can be displayed together with the statistical graph.

14 Claims, 6 Drawing Sheets

PROCESS
CAPABILITY cp  = 0.288675134
Cpk = 0.288675134 ize_ref># COMPACT ELECTRONIC EQUIPMENT HAVING A STATISTICAL FUNCTION

BACKGROUND OF THE INVENTION

1. Field of the Invention

The present invention relates to a compact electronic equipment having a statistical function. More particularly, the present invention relates to a compact electronic calculator having a function for calculating a process capability index.

2. Description of the Related Art

Some compact electronic equipment having a statistical function have a function for displaying a statistical graph. However, such electronic equipment can not display a graph of a mean value or a standard deviation of the displayed statistical data. Therefore, it is impossible to see any trend of a distribution of the data.

In particular, a compact electronic calculator can not make a calculation which requires statistical processing such as a calculation of a process capability index that is used as an index for quality control. Therefore, for example, to obtain a process capability index, it is necessary to obtain statistics (a mean value and a standard deviation) of the statistical data and to manually calculate the process capability index based on a specification range defined by upper and lower specification limits decided by a user. As a result, the calculation is troublesome when the statistical data are added and/or deleted.

Japanese Laid-Open Patent Publication No. 2-302622 discloses an analysis display system of a histogram, in which digital values of a maximum value, a minimum value and a mean value of histogram data between two optional points on the histogram and a linear histogram of the mean value are displayed over the histogram. Also in the electronic calculator of this system, however, a process capability index and the like should be manually calculated every time the statistical data are varied.

SUMMARY OF THE INVENTION

The compact electronic equipment of this invention comprises a statistical graph display means for displaying a statistical graph based on statistical data; and a calculation means for a calculation by using a statistic based on the statistical data to display a calculated result.

Thus, the invention described herein makes possible the advantages of (1) providing a compact electronic equipment which automatically makes a calculation which needs a statistical processing such as a calculation of a process ability index; (2) providing a compact electronic equipment which automatically calculates a process ability index and displays upper and lower specification limits used in the calculation of the process capability index over a statistical graph; and (3) providing a compact electronic equipment which automatically calculates a process capability index and displays upper and lower specification limits used in the calculation and a mean value and/or a standard deviation of the statistical data over a statistical graph.

These and other advantages of the present invention will become apparent to those skilled in the art upon reading and understanding the following detailed description with reference to the accompanying figures.

DESCRIPTION OF THE PREFERRED EMBODIMENTS

The present invention will now be described referring to the accompanying drawings.

Figure 1:
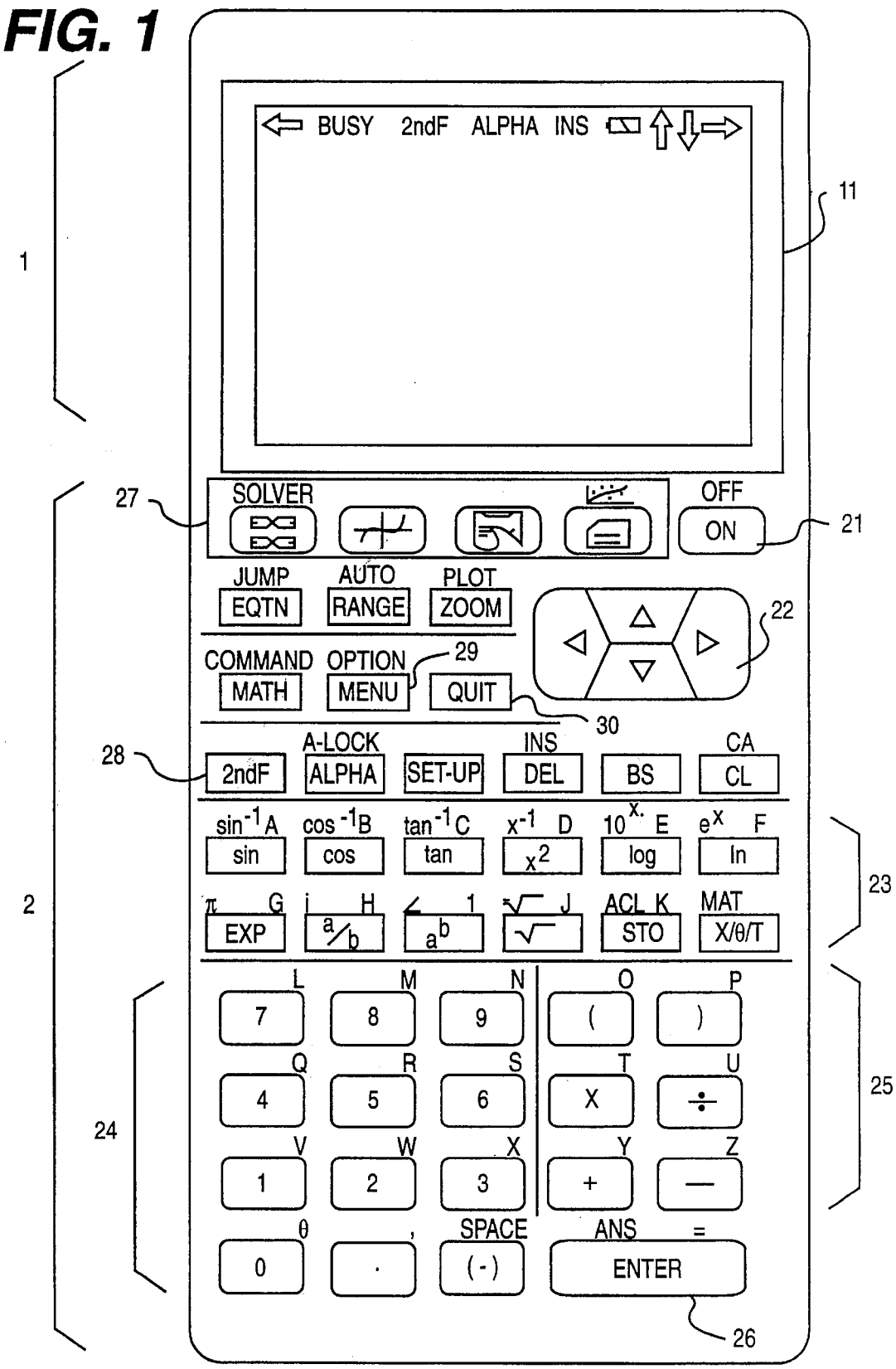
FIG. 1 is an external view of a compact electronic calculator having a function for calculating a process capability index according to the present invention.

FIG. 1 shows the appearance of a function calculator, which is a compact calculator having a function for calculating a process ability index, according to one embodiment of the present invention.

This function calculator comprises a display section 1 and an input section 2. The display section 1 has a liquid crystal display (LCD) 11. The input section 2 has the following keys: an ON/OFF key 21 for turning the power supply on or off; cursor keys 22 for moving a cursor in the LCD 11 while editing data, for scrolling the displayed data and the like; function keys 23 for functional calculations; numeric keys 24 for inputting numbers; four processing keys 25 for the direction of processing the four fundamental rules of arithmetic; an enter key 26 for the direction of registration of data, selection on the menu panel and the like; mode keys 27 for selecting a CALC mode for calculation, a GRAPH mode for displaying a graph, a PROGRAM mode for programming and a STAT mode for statistical processing; a second function key 28 for changing the function of each key to that indicated above the key; a menu key 29 for selecting a menu panel of each function; a QUIT key 30 for quitting the selected function or mode, and the like. The second function key 28 is pressed before a stroke of a desired key. For example, after the stroke of the second function key 28, the CALC mode key works as a SOLVER mode key for solving an expression and the STAT key works as a STAT GRAPH mode key for displaying a statistical graph.

Figure 2:
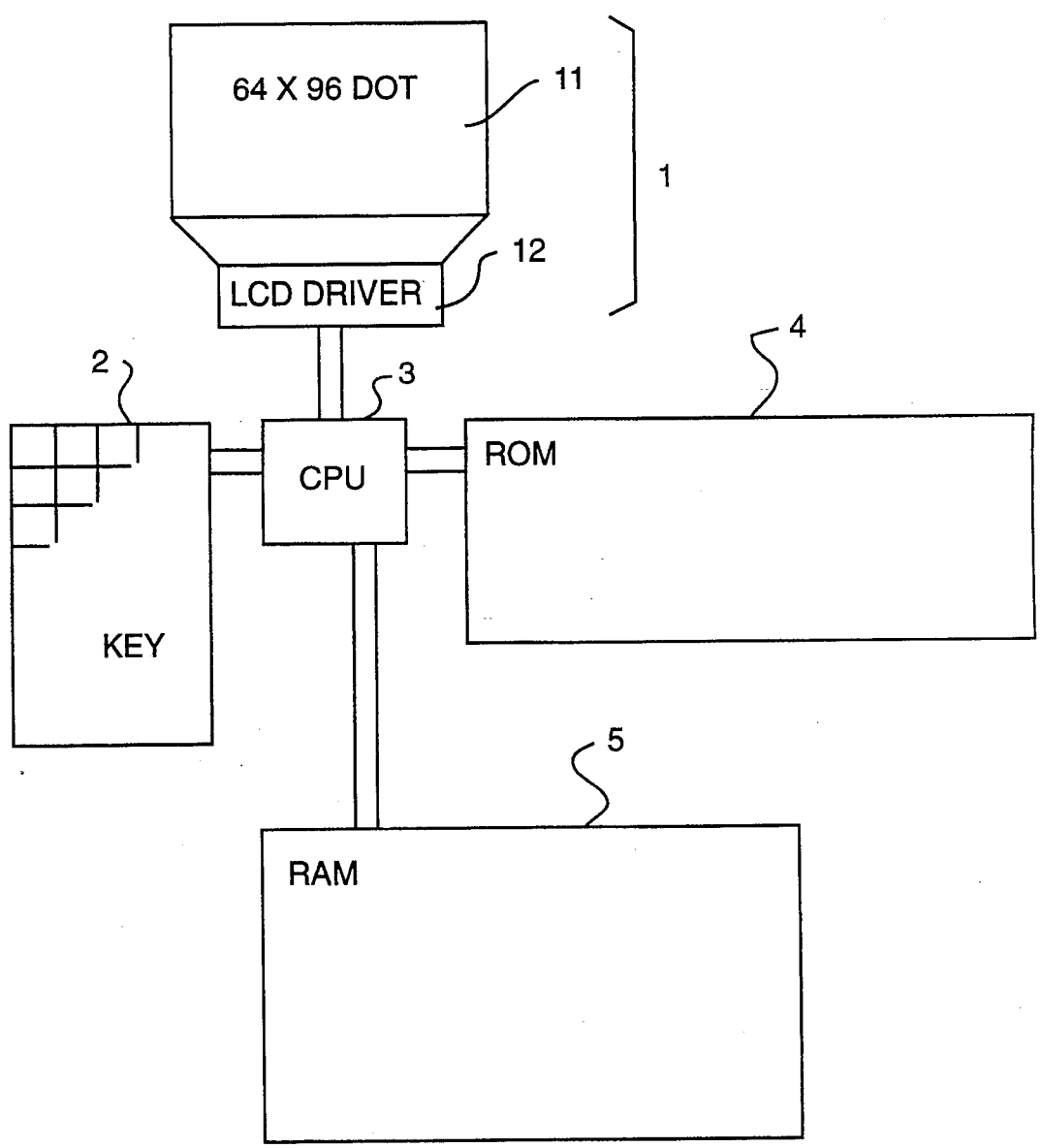
FIG. 2 is a system block diagram of the compact electronic calculator having a function for calculating a process capability index according to the present invention.

FIG. 2 is a system block diagram of the function calculator. This system comprises the display section 1 and the input section 2 as described above, a central processing unit (CPU) 3 for controlling the function calculator, a read only memory (ROM) 4 and a random access memory (RAM) 5 connected to the CPU 3. The display section 1 has not only the LCD 11 but also an LCD driver 12 for controlling the driving of the LCD 11. The LCD driver 12 is controlled by the CPU 3. The input section 2 detects the stroke of each key, that is, the input through each key.

The data having been written in the ROM 4 are, for example, expressions for calculating the process capability index, i.e., a one-sided specification Cpk and a two-sided specification Cp as described below, a format of a histogram for plotting a statistical graph, and a format of the menu panel in which a user selects the function for calculating the process capability index.

The RAM 5 stores the following: statistical data in a memory area SD; a mean value $\bar{x}$ of the stored statistical data; a standard deviation $\sigma$ of the stored statistical data; an upper specification limit UL and a lower specification limit LL input by a user to calculate the process capability index; and a limit flag LF for indicating whether or not reference lines indicating a mean value $\bar{x}$ and the upper and lower specification limits UL and LL are overwritten on the statistical graph shown on the LCD 11.

In this system, the CPU 3 displays the statistical data stored in the RAM 5 on the LCD 11 based on the format for the histogram of the statistical graph stored in the ROM 4 in response to an instruction input through the keys in the input section 2, or calculates the process capability index.

The process capability index will now be described in detail. The process capability index includes the two-sided specification Cp defined by both the upper and lower specification limits and the one-sided specification Cpk defined by one of the upper and lower specification limits. The two-sided specification Cp defined by both limits is obtained by the following Expression Ia; and the one-sided specification Cpk defined by either limit is a smaller value obtained by either of the following Expressions Ib:

Expression Ia: $Cp = \dfrac{UL - LL}{6\sigma}$

Figure 3:
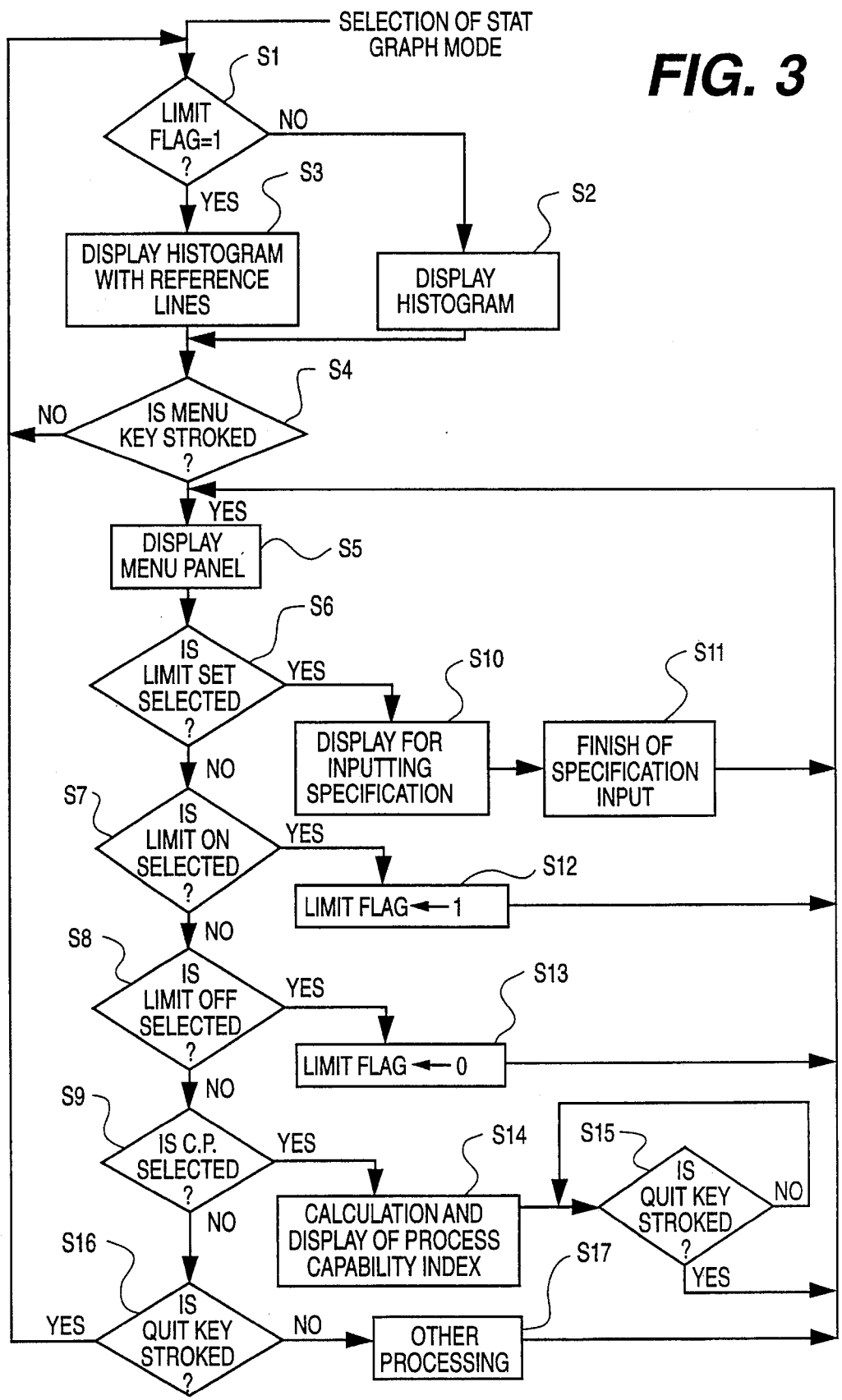
FIG. 3 is a flow chart showing processing steps for calculating a process capability index according to the present invention.

Expressions Ib: $Cpk = \dfrac{\bar{x} - LL}{3\sigma}, \dfrac{UL - \bar{x}}{3\sigma}$ FIG. 3 is a flow chart showing processing steps for calculating a process capability index according to the present invention.

Nine statistical data, for example, {1, 2, 2, 3, 3, 3, 4, 4, 5}, are previously registered as the statistical data required for calculating the process capability index. According to this embodiment, the statistical data are registered after selecting the input mode of the statistical data. The statistical graph mode is then selected by successively stroking the second function key 28 and the STAT GRAPH key among the mode keys 27.

Figure 4:
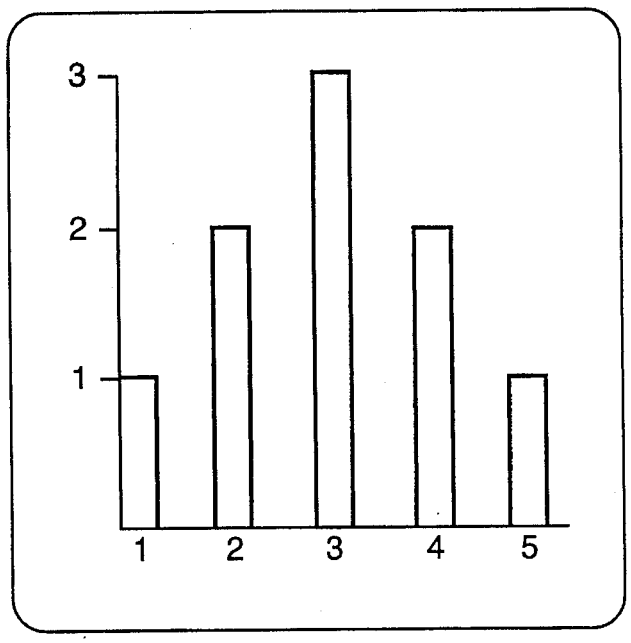
FIG. 4 shows an example of an image of a histogram displayed at the time of selecting a statistical graph mode in the compact electronic calculator of the present invention.
Figure 5:
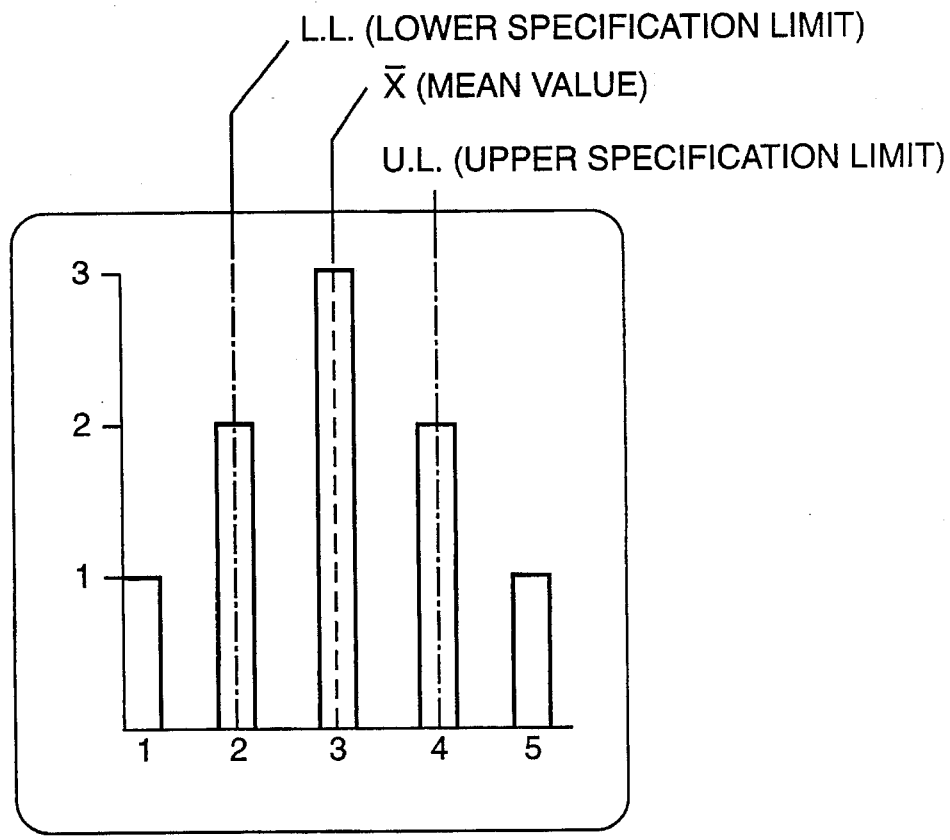
FIG. 5 shows an example of an image displayed at a time of selecting a mode in which reference lines respectively indicating an upper specification limit, a lower specification limit and a mean value are displayed over the histogram of FIG. 4 in the compact electronic calculator of the present invention.

When the statistical graph mode is selected, the CPU 3 checks whether or not the limit flag LF on the RAM 5 is 1 in Step S1. If the limit flag LF is not 1 (i.e., it is 0), the CPU 3 tabulates the registered statistical data to display a histogram as the statistical graph on the LCD 11 as is shown in FIG. 4 in Step S2. If the limit flag LF is 1, the CPU 3 displays reference lines respectively indicating the mean value and the upper and lower specification limits over the histogram on the LCD 11 as is shown in FIG. 5 in Step S3.

While displaying the statistical graph on the LCD 11, a stroke of the menu key 29 is detected in Step S4. If the menu key 29 is stroked, the menu panel is displayed on the LCD 11 in Step S5. If the menu key 29 is not stroked, the CPU 3 continues displaying the statistical graph.

Figure 6:
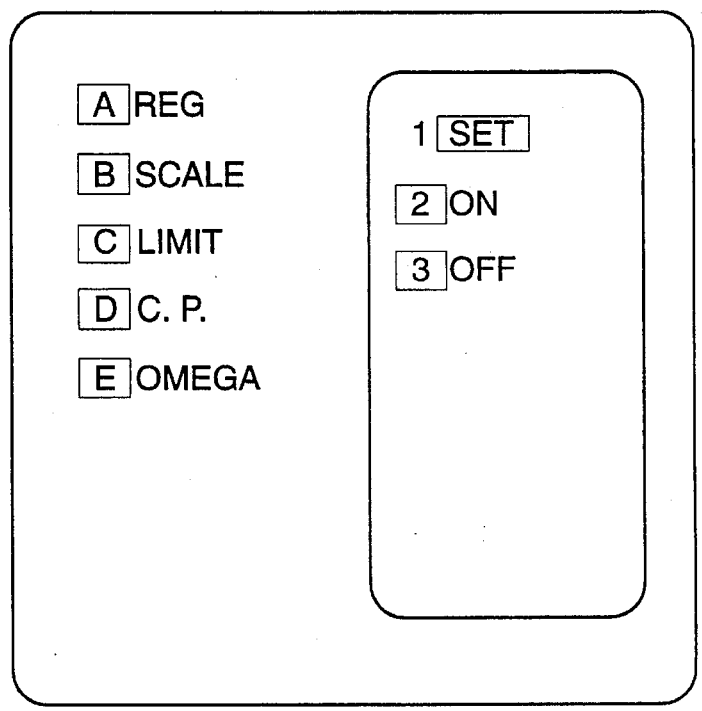
FIG. 6 shows a menu panel of the compact electronic calculator of the present invention.

On the menu panel, the following functions can be selected as shown in FIG. 6: A function for calculating a regression coefficient of the statistical data is selected by "REG"; a function for switching the scale on the ordinate of the statistical graph to be displayed between actual values and percentage values is selected by "SCALE"; a function for inputting upper and lower specification limits is selected by "LIMIT SET"; a function for plotting the reference lines respectively indicating a mean value and the upper and lower specification limits together with the statistical graph is selected by "LIMIT ON"; a function for canceling the display of the reference lines is selected by "LIMIT OFF"; a function for calculating and displaying the process capability index is selected by "C. P."; and a function for calculating a function of omega conversion is selected by "OMEGA". While the menu panel is being displayed, the program checks to see if strokes of "LIMIT SET", "LIMIT ON", "LIMIT OFF" and "C. P." are detected in Steps S6 to S9, respectively, i.e., the program checks to see if one of the above functions has been selected on the menu panel.

Figure 7:
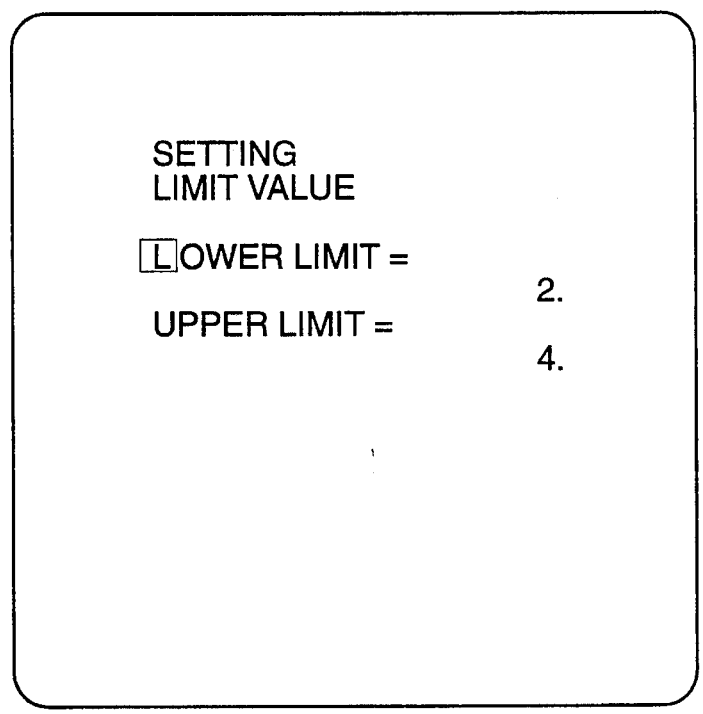
FIG. 7 shows a display for inputting values for an item having been selected on the menu panel of FIG. 6.

When "LIMIT SET" is selected, the letters on the menu panel are reversely displayed as is shown in FIG. 6. In such a case, the CPU 3 displays a display as is shown in FIG. 7 on the LCD 11 in Step S10. The user is thus urged to input the upper and lower specification limits. When the user finishes inputting the upper and lower specification limits in Step S11, the processing step returns to Step S5 and the CPU 3 displays the menu panel as is shown in FIG. 6 on the LCD 11 again. If the program does not detect that "LIMIT SET" has been selected, it checks to see if "LIMIT ON" has been selected on the menu panel.

At steps S6 through S9 checks are made to determine whether various conditions are set on the menu panel. As shown in FIG. 3, a negative determination of the check of step S6 is followed by the check of step S7, and so forth continuing to step S9, the negative determination of which is followed by step S16.

When "LIMIT ON" is selected on the menu panel, the CPU 3 sets the limit flag LF on the RAM 5 to be 1 in Step S12 and continues displaying the menu panel as is shown in FIG. 6. When "LIMIT OFF" is selected, the CPU 3 sets the limit flag LF on the RAM 5 to be 0 in Step S13 and continues displaying the menu panel. If the program does not detect that "LIMIT ON" has been selected, it checks to see if "C.P." has been selected on the menu panel.

Figures 8, 9:
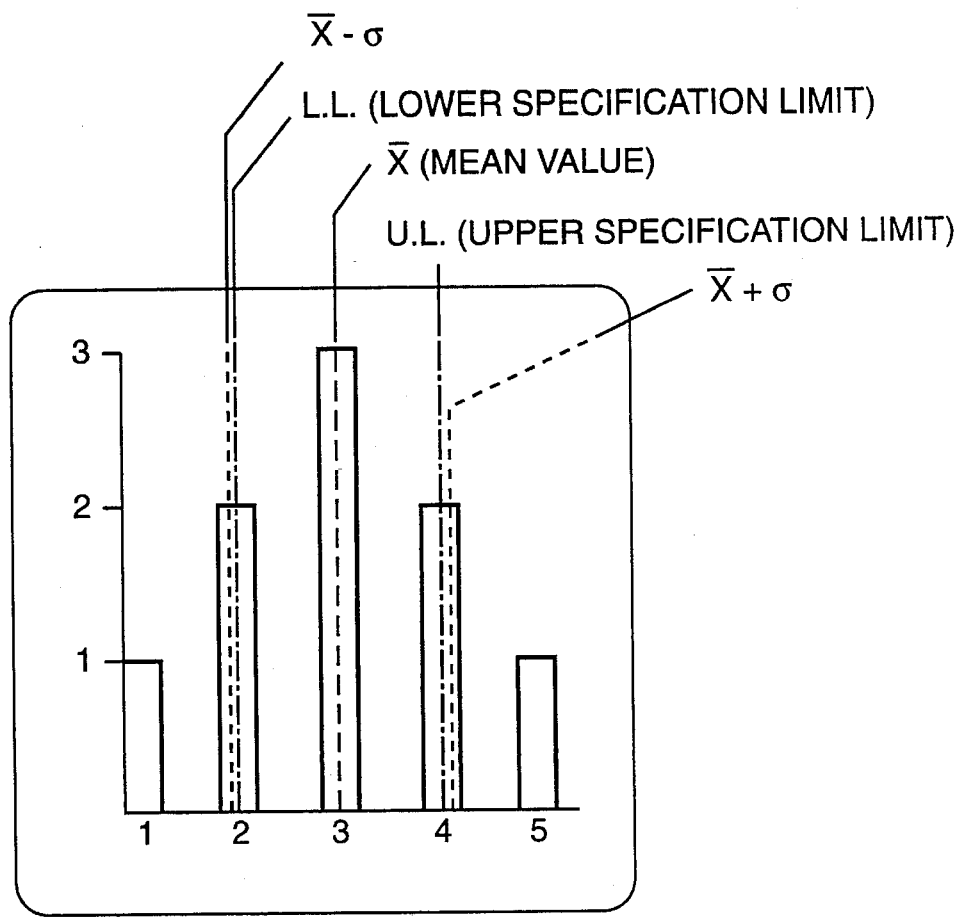
FIG. 8 shows an example of a display screen displayed when a function for calculating a process capability index is selected on the menu panel of FIG. 6.
FIG. 9 shows an example of a display screen displayed at the time of selecting a mode in which reference lines respectively indicating an upper specification limit, a lower specification limit, a mean value and a standard deviation are displayed over the histogram of FIG. 4 in the compact electronic calculator according to the present invention.

When "C. P." is selected on the menu panel, the CPU 3 calculates the two-sided specification Cp and the one-sided specification Cpk in accordance with the above-mentioned Expressions Ia and Ib stored in the ROM 4 by using the upper and lower specification limits input by the user and the mean value and the standard deviation of the statistical data in Step S14, and then displays the results of the calculation on the LCD 11 as is shown in FIG. 8. Then, a stroke of the QUIT key 30 is awaited in Step S15. The CPU 3 maintains the display until the QUIT key 30 is stroked. When the QUIT key 30 is stroked, the processing step returns to Step S5, and the CPU 3 displays the menu panel as is shown in FIG. 6 on the LCD 11. If the program does not detect that "C.P." has been selected, it checks to see if the QUIT key has been stroked while the menu panel is being displayed.

If the QUIT key 30 is stroked while the menu panel is being displayed, the CPU 3 stops displaying the menu panel and the processing step returns to Step S1 in step S16. The statistical graph is displayed again by determining, referring to the value of the limit flag LF in Step S1 as mentioned above, whether a histogram alone is to be displayed as is shown in FIG. 4 or a histogram is to be displayed together with the reference lines as is shown in FIG. 5.

If the other function such as "REG" is selected while the menu panel is being displayed, the corresponding process is conducted in Step S17, and then, the process step returns to Step S5. The CPU 3 displays the menu panel as is shown in FIG. 6 on the LCD 11.

In this manner, as shown in FIG. 9 the statistical graph of the statistical data can be displayed together with a reference line indicating the mean value according to the present invention. The distribution trend of the statistical data can be readily grasped. Moreover, the upper and lower specification limits, which define values desired by a user, can also be displayed as reference lines. The characteristics of the statistical data can thus be easily evaluated. More specifically, by using statistics such as a mean value and a standard deviation of the statistical data which have already been obtained, a step capability index can be automatically obtained based on the upper and lower specification limits which have been previously input. As a result, a step capability index can be readily obtained even when the statistical data are added and/or deleted, or when the upper and lower specification limits are changed.

In the above-mentioned embodiment, the reference lines indicating a mean value and the upper and lower specification limits are overwritten on the statistical graph. In another embodiment, however, a line indicating $\bar{x} \pm \sigma$ can be displayed as a reference line indicating the standard deviation σ as seen in FIG. 9.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A compact electronic equipment comprising:

data input means for inputting statistical data;

display means for displaying a statistical graph of the inputted statistical data; and calculation means for performing a statistical calculation on the basis of the inputted statistical data and obtaining at least one statistic, wherein the calculation means performs a further calculation using the at least one statistic.

2. A compact electronic equipment according to claim 1, wherein the display means selectively displays at least one reference marking corresponding to the at least one statistic on the statistical graph.

3. A compact electronic equipment according to claim 1, wherein the further calculation is a predetermined calculation using a predetermined formula, and wherein the calculation means selectively automatically performs the further calculation using the at least one statistic.

4. A compact electronic equipment according to claim 1, wherein the input means further inputs at least one of an upper specification limit and a lower specification limit, and the calculation using the at least one statistic includes a calculation for obtaining a process capability index on the basis of the at least one specification limit and the at least one statistic.

5. A compact electronic equipment according to claim 4, wherein the display means superimposes at least one reference marking indicating the at least one of the upper specification limit and the lower specification limit used in the calculation for obtaining the process capability index on the statistical graph.

6. A compact electronic calculator having a statistical processing capability, the calculator comprising:

an input device including a data input section for inputting data, a graph display requestor element for requesting a graphical statistical display of the inputted data, and at least one element for selectively setting at least one display input parameter;

a display device;

a memory for storing the inputted data and the at least one display input parameter;

a processor which:

in response to the graph display requestor element, generates display signals for application to the display device whereby the display device provides a graphical display derived from the inputted data stored in the memory, calculates a statistical calculation result with respect to the inputted data, automatically performs, in response to the setting of the at least one display input parameter, a further calculation using the statistical calculation result.

7. The apparatus of claim 6, wherein the graphical display is in the form of a histogram.

8. The apparatus of claim 6, wherein the reference marking includes a marking which represents either of the at least one display parameter and another parameter obtained by the statistical calculation performed by the processor on the basis of the inputted data.

9. The apparatus of claim 6, wherein at least one reference marking is superimposed on the graphical display, the reference marking serves to illustrate the statistical calculation result obtained by the processor on the basis of the inputted data.

10. The apparatus of claim 9, wherein the at least one reference marking illustrates a mean value statistical calculation performed by the processor.

11. The apparatus of claim 9, wherein a further display input parameter signifies whether the at least one reference marking is to be provided on the graphical display.

12. The apparatus of claim 9, wherein the at least one reference marking illustrates a specification limit inputted by the input device.

13. The apparatus of claim 12, wherein the at least one display input parameter signifies whether the at least one reference marking is to be provided on the graphical display, and wherein a setting of a second display input parameter is used to determine the specification limit.

14. The apparatus of claim 12, wherein a further display input parameter signifies whether the at least one reference marking is to be provided on the graphical display, and wherein a setting of the at least one input parameter causes the processor to require that a process capability index be displayed on the display device.

\* \* \* \* \*

UNITED STATES PATENT AND TRADEMARK OFFICE
CERTIFICATE OF CORRECTION

PATENT NO. : 5,586,060
DATED : December 17, 1996
INVENTOR(S) : Kuno et al.

It is certified that error appears in the above-indentified patent and that said Letters Patent is hereby corrected as shown below:

On the title page, insert the following information:

-- [30]  Foreign Application Priority Data

June 29, 1992   [JP]   Japan ................4-170526 --

Signed and Sealed this

Tenth Day of June, 1997

Attest:

Attesting Officer

BRUCE LEHMAN

Commissioner of Patents and Trademarks